United States Patent [19]

Hakamata

[11] 4,435,011
[45] Mar. 6, 1984

[54] SEAT WITH A DUAL-ADJUSTABLE ARMREST

[75] Inventor: Hitoshi Hakamata, Yokohama, Japan

[73] Assignee: Nissan Motor Company, Limited, Yokohama, Japan

[21] Appl. No.: 360,168

[22] Filed: Mar. 22, 1982

[30] Foreign Application Priority Data

Mar. 26, 1981 [JP] Japan ............................ 56-44477

[51] Int. Cl.³ .............................................. A47C 7/54
[52] U.S. Cl. ................................... 297/113; 297/238; 297/417
[58] Field of Search ............... 297/113, 115, 116, 117, 297/238, 411, 417

[56] References Cited

U.S. PATENT DOCUMENTS 2,824,599 2/1958 Quinlan .......................... 297/113 X
4,141,586 2/1979 Goldner ......................... 297/117 X
4,219,235 8/1980 Heling ................................ 297/417

FOREIGN PATENT DOCUMENTS 2287193 5/1976 France .

95094 3/1939 Sweden ............................ 297/417

Primary Examiner—William E. Lyddane
Assistant Examiner—Peter R. Brown
Attorney, Agent, or Firm—Schwartz, Jeffery, Schwaab, Mack, Blumenthal & Koch

[57] ABSTRACT

A seat has an armrest pivotable between an operating position approximately parallel to the seat cushion and a position parallel to the seat back, and translatable in the operating position between two heights with respect to the seat cushion. A first bracket fixed to the seat back includes an arcuate cut-out and a pin-receiving portion. A second bracket is pivotably connected to the first bracket opposite a first end of the cut-out, and is pivotably connected to the armrest, the distance between the pivotal points approximating the radius of curvature of the cut-out. The armrest has a projecting pin engageable in the cut-out, which serves to guide the pin, and thus the armrest, during rotation of the armrest. A recess at the first end of the cut-out allows the pin to disengage therefrom and the pin can then be raised to the level of the pin-receiving member and supported thereby.

8 Claims, 8 Drawing Figures

SEAT WITH A DUAL-ADJUSTABLE ARMREST

BACKGROUND OF THE INVENTION

1. Field of the Invention

The present invention relates generally to a seat with an arm rest adjustable to either of two angular positions and to at least two heights with respect to the seat back, and utilized as a piece of furniture or as a passenger's seat mounted in an automotive vehicle, vessel, or air plane, etc.

2. Description of the Prior Art

A conventional seat comprises a seat, a seat back, and an arm rest supported by the seat back via a linkage so as to be free to tilt forward at an angle with respect to the seat back. The center portion of the seat back is provided with a recess in which the arm rest can be housed. The linkage between the seat back and arm rest comprises on each side of the arm rest a first bracket attached to a frame provided at the recess in the seat back, a second bracket attached to a frame along the longitudinal axis of the arm rest, and upper and lower links between the first and second brackets.

However, there is a drawback in a conventional seat as described above. Specifically, one end of each of the upper and lower links is merely rotatably fixed to the first bracket so that the height of the arm rest with respect to the seat is fixed when the arm rest is tilted forward so as to be approximately parallel to the seat. Consequently, free adjustment of the height for the arm rest is impossible. In addition, other kinds of seats may employ a bracket of a pin hinge type in the seat back in place of the bracket of the link type. The pin hinge type has the same drawback as the conventional seat of the link type.

SUMMARY OF THE INVENTION

With the above-described drawback in mind, it is an object of the present invention to provide a seat in which the height of the arm rest when the arm rest is parallel to the seat is adjustable to one of at least two positions of height.

This can be achieved by supporting an axle supporting member for rotatably supporting the arm rest at one end of the first bracket attached to the seat back, providing a cut-out engageable slidably with a stopper pin within a second bracket for fixing the seat back or other seat member so that a movement amount of the stopper pin is restricted during a normal rotation of the stopper pin provided at the arm rest, providing a pin receiving member at an upper portion of the cut-out for receiving the stopper pin when the arm rest is moved upward, and furthermore providing a first rotating center of the arm rest at both first and second brackets and a second rotating center for adjusting the height of the arm rest in the horizontal direction with respect to the seat.

BRIEF DESCRIPTION OF THE DRAWINGS

The features and advantages of the present invention will be clearly appreciated from the foregoing description in conjunction with the attached drawings in which like reference numerals designate corresponding elements and in which.

DETAILED DESCRIPTION OF THE PREFERRED EMBODIMENTS

Reference will be made hereinafter to the attached drawings and initially to FIGS. 1 and 2 which show a conventional seat.

Figure 1:
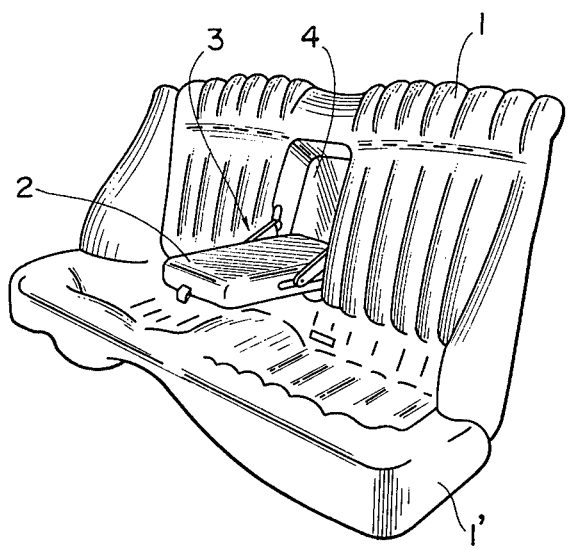
FIG. 1 is a perspective view of a conventional seat with an arm rest.

In FIG. 1, numeral 1 denotes a seat back, numeral 2 denotes an arm rest attached to the seat back 1 between two body-sized portions of the seat, numeral 3 denotes a linkage for supporting the arm rest 2 in a position approximately parallel with respect to the seat 1', and numeral 4 denotes a recess in the seat back 1 for housing the arm rest 2 therewithin. The linkage 3 comprises, as shown in FIG. 2, (a) a first fixing bracket 1a attached to the seat back 1, (b) a second fixing bracket 2a attached to the frame of the arm rest 2, and (c) upper and lower link brackets 3a and 3b for linking the second bracket with the first bracket.

Figure 2:
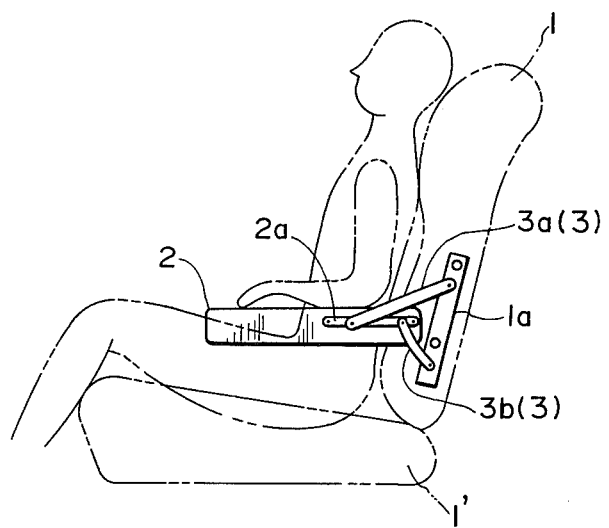
FIG. 2 is an explanatory view of the conventional seat shown in FIG. 1 with the arm rest tilted forward.

Such a linkage 3 as shown in FIG. 2 does not permit adjustment of the height of the arm rest 2 with respect to the seat 1' when the arm rest 2 is tilted toward the seat 1' as shown in FIG. 2.

FIGS. 3 through 8 illustrate a preferred embodiment of the seat according to the present invention. The seat according to the present invention comprises essentially a first bracket 5 acting as a rotational member and a second bracket 6 acting as a fixing member, in addition to the conventional elements, i.e., the seat 1', seat back 1, and arm rest 2.

Figure 7:
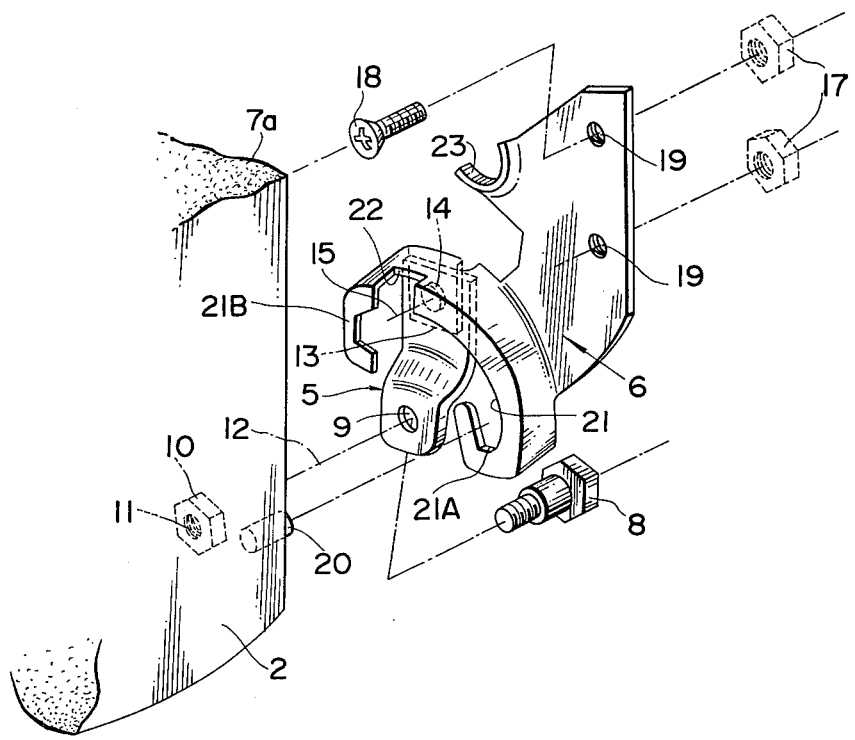
FIG. 7 is an exploded view of an essential part of the arm rest, first and second brackets, and the seat back.
Figure 8:
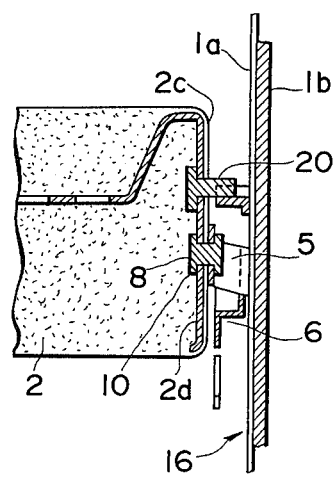
FIG. 8 is an cross-sectional view taken along a line running through bolt 8 and pin 20 in FIG. 6.

The first bracket 5 comprises a first hole 9 for a bolt 8 near one end thereof and a second hole for a pin 14 near the other end thereof, as can be clearly seen in FIG. 7. The bolt 8 is used specifically as "an axle supporting member" which rotatably supports a side surface 2c (FIG. 8) of the arm rest 2. The first bracket 5 is linked with the arm rest 2 by screwing the bolt 8 into the first hole 9 and into a third hole 11 of a nut 10 welded to the side surface 2c of the arm rest 2 (in more detail, provided on an arm rest frame 2d within the side surface 2c of the arm rest 2 as clearly seen from FIG. 8). The bolt 8 serves as a first rotating center 12 for the arm rest 2. Furthermore, the second hole provided at the end of the first bracket 5 is linked with a tab 13 of the second bracket 6, to be described hereinafter, via the hinge pin 14. The hinge pin 14 serves as a second rotating center 15 for adjusting the height of the arm rest 2.

The second bracket 6 is fixed to the seat back 1 to support the first bracket 5 via the hinge pin 14 as stated above. In more detail, the second bracket 6 is provided with at least one fourth hole 19 for at least one screw 18.

The screw 18 is inserted through the fourth hole 19 and screwed into another nut 17 on the oppoite side of the seat back side surface 1a which faces the side surface 2c of the arm rest 2 when the arm rest 2 is housed within the recess 4 of the seat back 1. In addition, the second bracket 6 is provided with an arc-shaped cut-out 21 for receiving a stopper pin 20 projecting from the side surface 2c of the arm rest 2 and limiting the range of movement of the stopper pin 20 during normal rotation of the arm rest 2. Furthermore, the second bracket 6 is provided with a groove 22 near the upper end of the cut-out 21 which allows engagement and disengagement of the stopper pin 20 from the cut-out 21 and also is provided with a pin-receiving member 23 at the upper portion of the bracket 6 for receiving the stopper pin 20 when disengaged from the cut-out 21. The pin-receiving member (or second stopper) 23 is of a substantially semi-circular shape and is formed integrally with the second bracket 6. Alternatively, a pin-receiving member 23 of another material may be attached to the second bracket 6 by means of welding or another technique. As described hereinabove, the tab 13 is provided opposite the cut-out 21 for linking the second bracket 6 with the first bracket via the hinge pin 14. It will be noted that the first and second brackets 5 and 6 are provided in combination at both sides of the arm rest 2 and at corresponding sides of the recess 4 of the seat back 1. Alternatively, the second bracket 6 may be attached to the vehicle body at the rear surface of the seat back 1 or at another fixing position (not shown).

Figure 3:
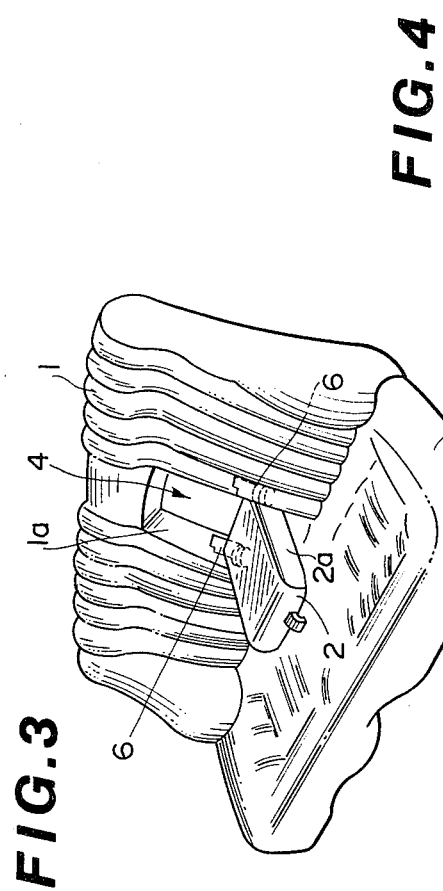
FIG. 3 is a perspective view of a seat with an arm rest employing a preferred embodiment of the present invention.

Next, the operation of the seat shown in FIG. 3 will be described.

Figure 4:
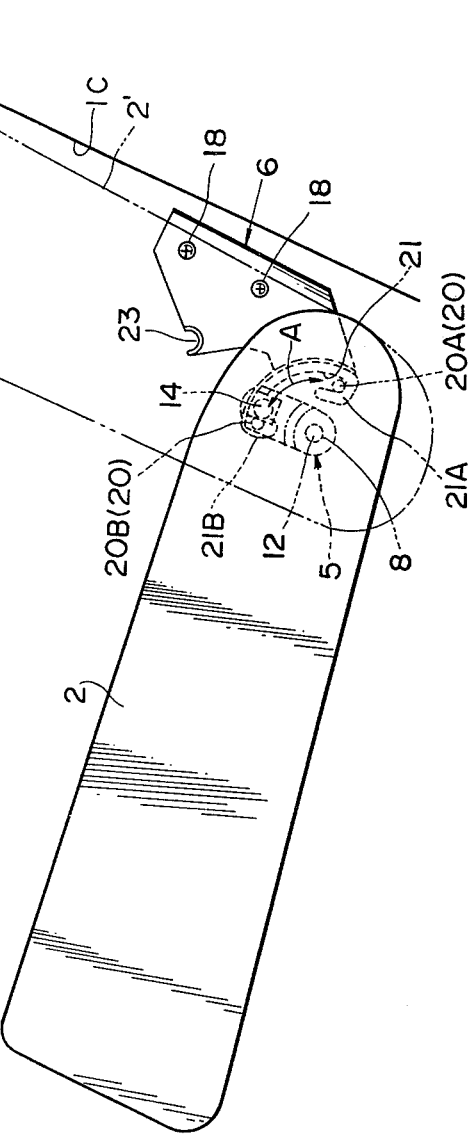
FIG. 4 is an enlarged view of an arm rest of the seat shown in FIG. 3 said arm rest being shown in the lower height position.

First, the case of simple arm rest rotation will be explained. In FIG. 4, the first rotating center 12 is placed at the lowest position thereof and the arm rest 2 can be rotated counterclockwise and clockwise within a range shown by an arrow-marked line A about the first rotating center 12. In other words, when the arm rest 2 is pulled forward with respect to the seat back 1 (left direction in FIG. 4) from a position 2' denoted by a phantom line, the arm rest 2 is rotated counterclockwise to tilt forward with respect to the seat back 1 about the first rotating center and the stopper pin 20 is engaged with the arc-shaped cut-out 21 of the second bracket 6 so that the range of movement of the stopper pin 20 is limited to between a position 20A denoted by a phantom line in FIG. 4 and another position 20B denoted by a dotted line. When the arm rest 2 is rotated fully counterclockwise, it comes to rest at the position shown by solid lines in FIG. 4, i.e., at position 0' in FIG. 5. In this way, the stopper pin 20 of the arm rest 2 moves between the ends 21A (or third stopper) and 21B (or first stopper) of the cut-out 21. In this case, the first bracket 5 does not move at all.

Secondly, the case in which the height of the arm rest 2 is adjusted will be explained with reference to FIGS. 5 and 6.

Figure 5:
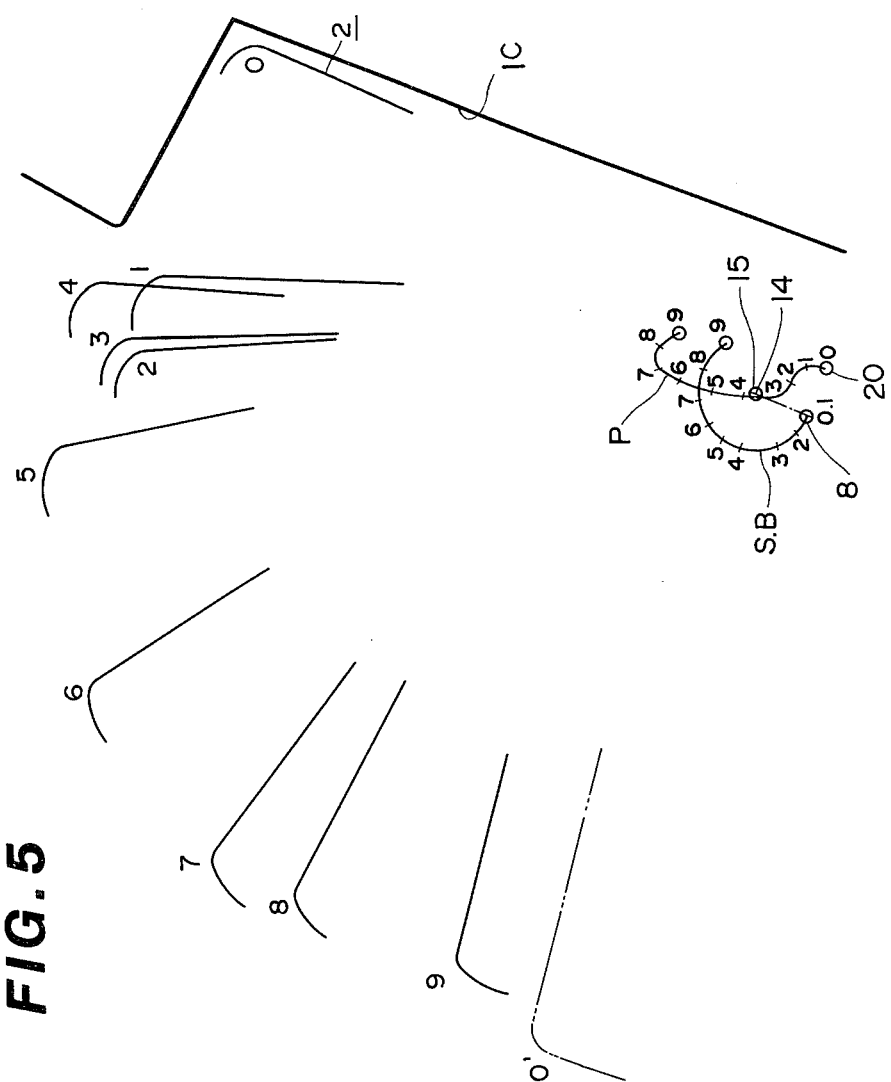
FIG. 5 is an explanatory diagram of the arm rest shown in FIG. 4 showing the relationships of the loci of the arm rest, a stopper pin, and a special bolt as the arm rest is moved.
Figure 6:
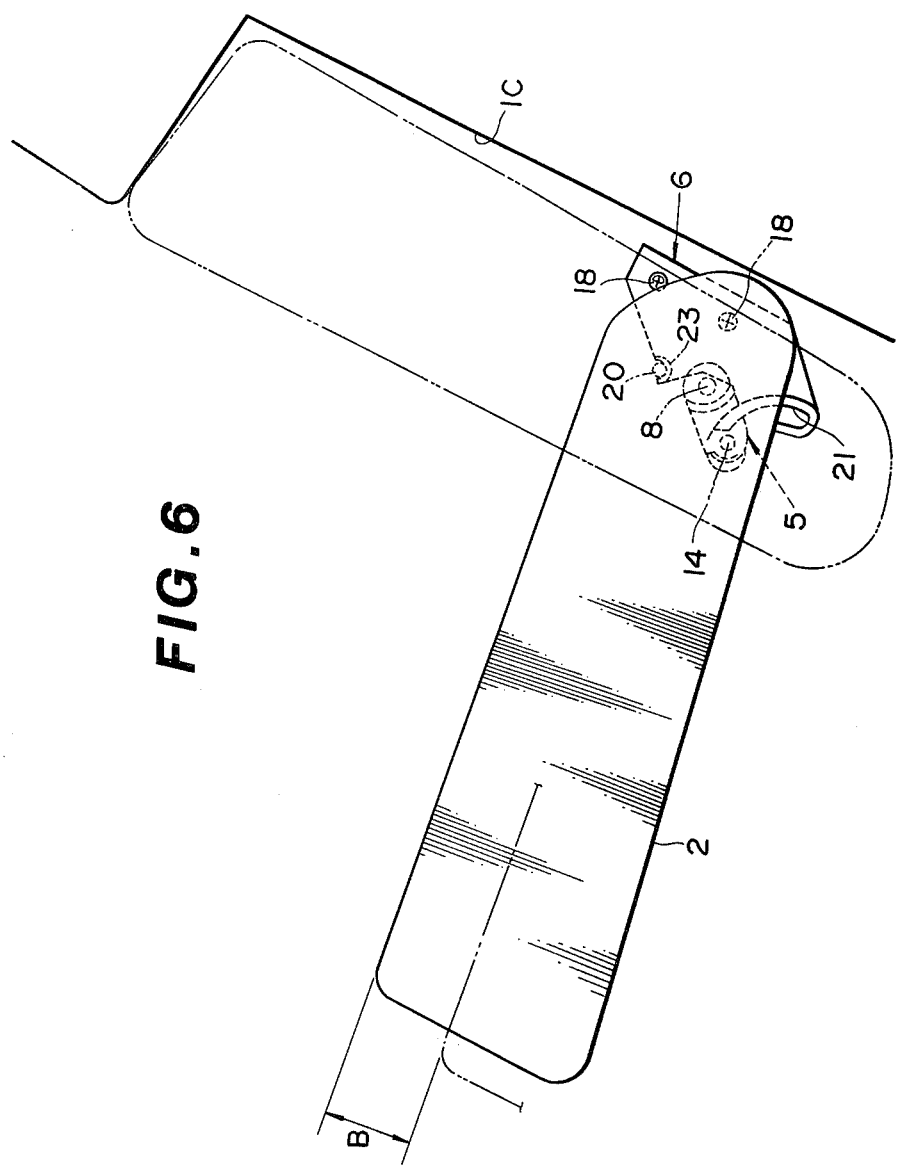
FIG. 6 is an enlarged view of the arm rest shown in FIGS. 3 and 4, said arm rest being shown in the upper height position.

When the arm rest 2 is rotated slightly counterclockwise from the housed position (at this time, the stopper pin 20 and the bolt 8 are at position 1 shown in FIG. 5) and pulled upward with respect to the seat 1', the first bracket 5 starts rotating about the second rotating center 15 of the hinge pin 14, so that the bolt 8 follows locus S.B. and the stopper pin 20 is disengaged from the cut-out 21 to follow locus P.

It should be noted in FIG. 5 that the numerals denoted along the locus P and locus S.B. correspond to the numerals denoting the respective positions of the arm rest 2.

In this way, the arm rest 2 simultaneously rotates and translates from the first position (1) to the ninth position (9) shown in FIG. 5. The distance of height of the stopper pin, i.e., the vertical movement of the arm rest 2, is denoted by B in FIG. 6. The stopper pin 20 is then supported by the pin receiving member 23 of the second bracket 6.

In order to return the arm rest 2 to its original height within the recess 4 of the seat back 1, the arm rest 2 needs to be lifted slightly upward to disengage the stopper pin 20 from the pin-receiving member 23. Subsequently when the arm rest 2 is lowered by its own weight with elements 8 and 20 of the first bracket 5 following the loci S.B. and P in the reversed direction as described above, the stopper pin 20 is engaged with the cut-out 21 so that the arm rest 2 returns to its original position.

The shape of the second bracket 6 is not limited to that shown in these drawings. Particularly, a pin-receiving member may also be formed along the cut-out 21.

As described above, according to the present invention a seat of the construction described above allows the height of an arm rest with respect to the seat to be adjusted to either of two steps according to the convenience of the user. Furthermore, modification of a conventional seat to include the features of the present invention can be made simply by replacing the first and second brackets described above without modifications to the seat back, so that the difference between the two height positions of the arm rest can easily be set according to the model and type of automotive vehicle in which the seat is mounted.

In addition, since the second bracket is used merely as the fixing member as described hereinbefore, a portion of the second bracket to be attached to the seat back in the preferred embodiment may be attached to another fixed structure adjacent to the seat back.

It will be fully understood by those skilled in the art that modifications may be made in the preferred embodiment described hereinbefore without departing from the spirit and scope of the present invention, which is to be defined by the appended claims.

What is claimed is:

1. A seat having an arm rest and a seat back, comprising:
    (a) a first member fixedly attached to said seatback, said first member having a first stopper and a second stopper vertically spaced from said first stopper;
    (b) a second member rotatably supported at an upper end thereof by said first member, said second member being rotatably connected at the lower end thereof with said arm rest;
    (c) a projection protruding from said arm rest and being engaged with said first stopper when said arm rest is tilted to a first set position, said projection being engaged with said second stopper when said arm rest is placed in a second set position while said second member is rotated, said second set position being vertically spaced from being said first set position.

2. A seat as set forth in claim 1, which further comprises a third member which rotatably supports said second member at the lower end of said second member so as to connect said second member with said arm rest.

3. A seat as set forth in either claim 1 or 2, which further comprises a fourth member which rotatably hinges said second member at the upper end thereof on said first member.

4. A seat as set forth in claim 1, wherein said first member has a third stopper with which said projection is engaged when said arm rest is placed in parallel with said seat back.

5. A seat as set forth in claim 3, wherein said first member has an arcuate cutout portion, one end of said arcuate cutout portion being said first stopper and the other end thereof being said third stopper, so as to provide a movable range for said projection.

6. A seat as set forth in claim 5, wherein said first member has a recess at one end of said cutout portion so as to provide a passage allowing engagement and disengagement of said projection with and from said cutout portion.

7. A seat as set forth in claim 5, wherein said second stopper is a semi-circular recess located above said cutout portion.

8. A seat as set forth in claim 1, wherein said second stopper is a semi-circular recess located so that said second member is rotated about the upper end thereof and said projection is supported.

* * * * *